United States Patent [19]
LaBudde et al.

[11] Patent Number: 4,564,757
[45] Date of Patent: Jan. 14, 1986

[54] MIRROR POSITION SENSOR FOR IMPROVED TRACK SELECTION IN OPTICAL DATA DISK SYSTEM

[75] Inventors: Edward V. LaBudde, Newbury Park; Jeffrey E. Niven, Camarillo; Der-Chang Hsieh, Thousand Oaks; Roger C. Parker, Camarillo; Robert Jeffery Johnson, Thousand Oaks, all of Calif.

[73] Assignee: Burroughs Corporation, Detroit, Mich.

[21] Appl. No.: 430,284

[22] Filed: Sep. 30, 1982

[51] Int. Cl.⁴ .............................................. H01J 5/02
[52] U.S. Cl. ................................... 250/239; 250/234; 369/44
[58] Field of Search ............... 250/235, 236, 239, 230, 250/234, 201, 202; 358/293, 206, 208; 350/6.5, 6.6, 6.9; 365/234; 369/44, 46, 32, 33, 119

[56] References Cited

U.S. PATENT DOCUMENTS

| | | | |
|---|---|---|---|
| 3,617,759 | 11/1971 | Martin | 250/234 |
| 3,632,868 | 1/1972 | Gaffard | 250/235 |
| 4,330,880 | 5/1982 | Van Dijk | 250/201 |
| 4,423,496 | 12/1983 | Opheij et al. | 369/44 |

Primary Examiner—David C. Nelms
Assistant Examiner—J. Gatto
Attorney, Agent, or Firm—John J. McCormack; Nathan Cass; Kevin R. Peterson

[57] ABSTRACT

Disclosed is a laser recording arrangement including a mirror for redirecting the laser beam in a controlled scan mode plus an associated electro-optical position monitor for monitoring mirror orientation, these being housed in a unitary casting.

19 Claims, 13 Drawing Figures

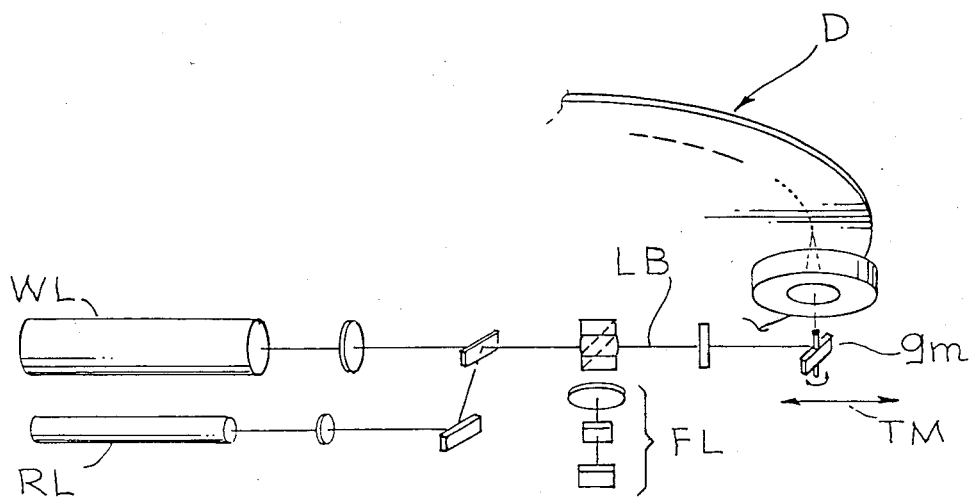
Fig. 1
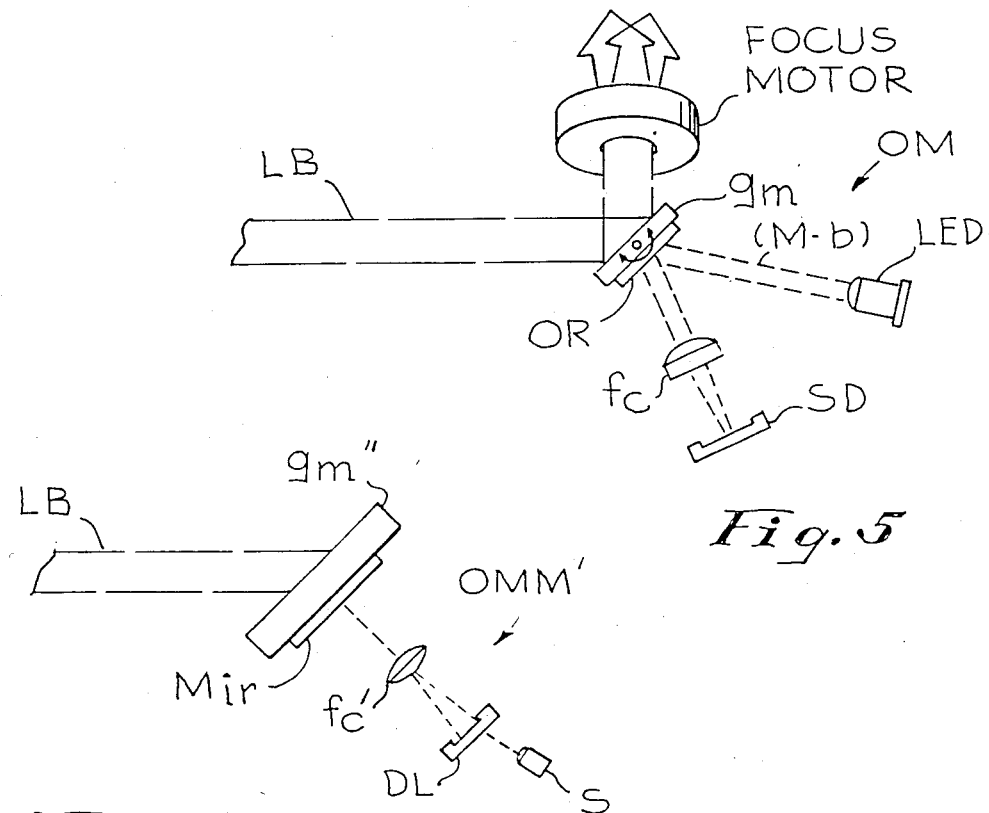
Fig. 5
Fig. 12

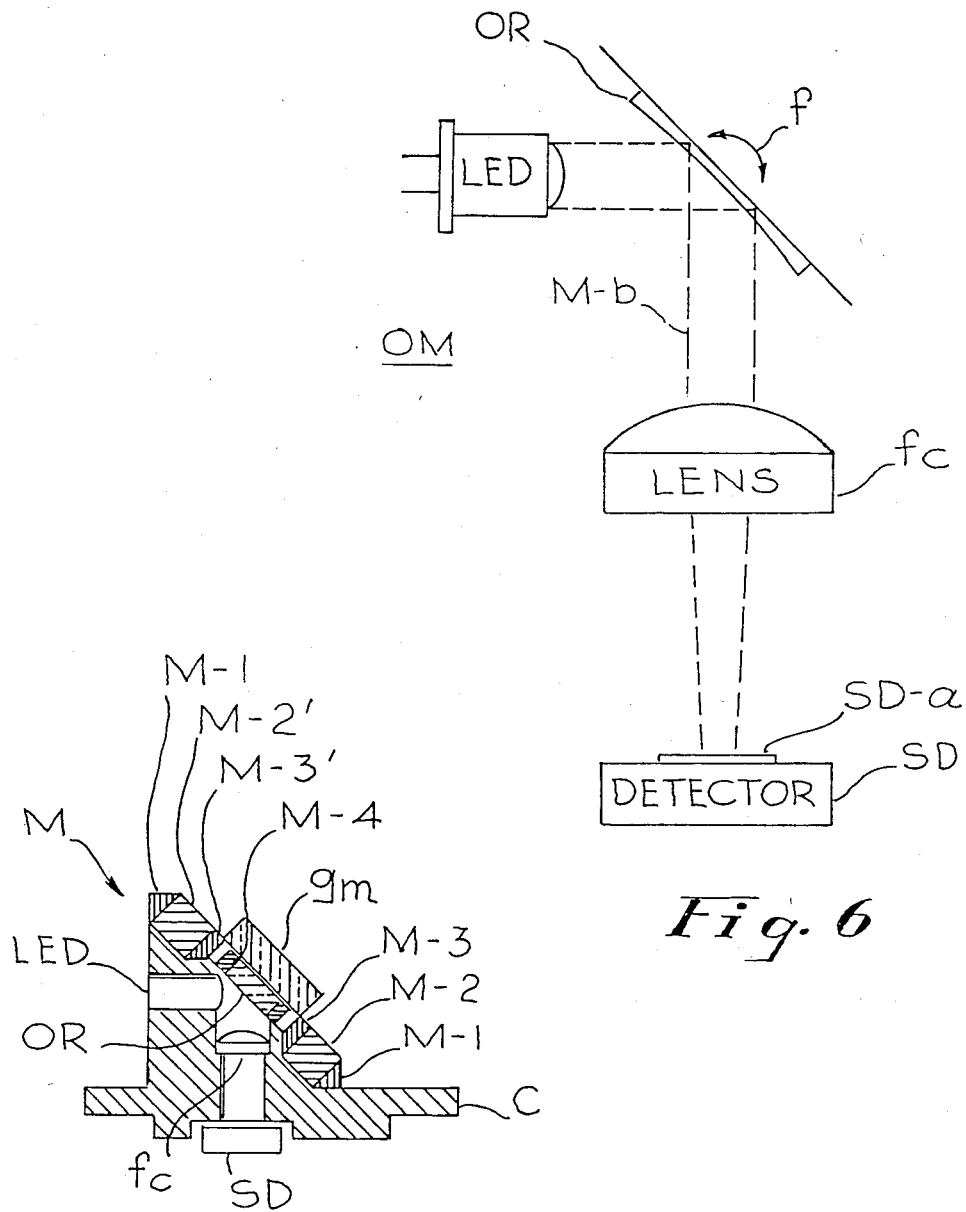
Fig. 6
Fig. 7
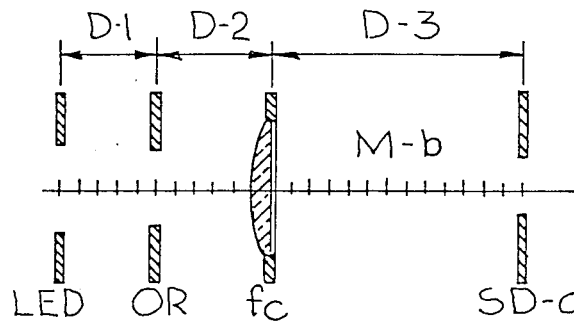
Fig. 8

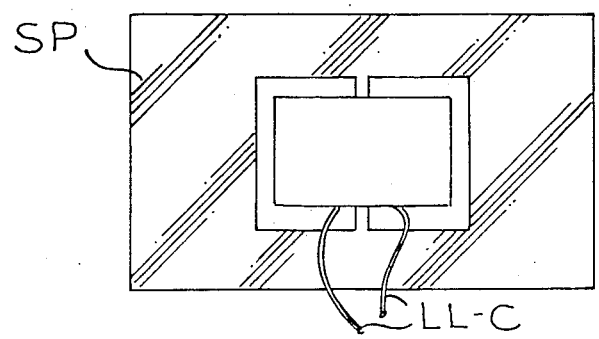
Fig. 9A
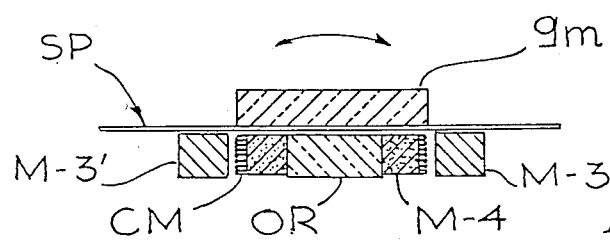
Fig. 9B
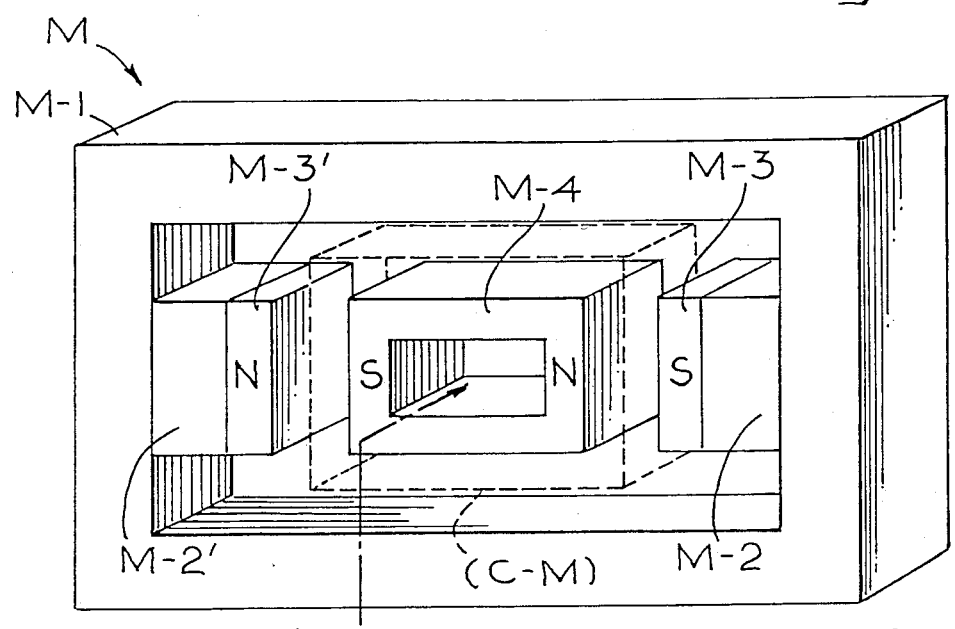
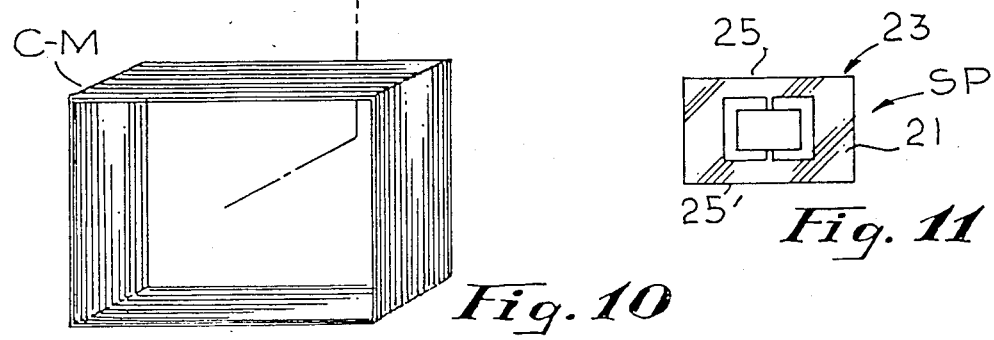
Fig. 10
Fig. 11

MIRROR POSITION SENSOR FOR IMPROVED TRACK SELECTION IN OPTICAL DATA DISK SYSTEM

BACKGROUND OF THE INVENTION

The present invention relates generally to improved means and methods for optically recording and/or reading, data on disks, and more particularly to improved means and methods using reflector means for selecting and following data tracks thereon, for providing improved pivot-mount means for this reflector means, and for monitoring such pivoting.

In recent years considerable effort has been expended to develop improved methods and apparatus for optically recording and reading on a suitable medium because of the unusually high recording density potential offered by optical recording. Examples of various known methods and approaches are revealed in the following references:

| U.S. Pat. No. | Date Issued | Inventor(s) |
|---|---|---|
| 4,216,501 | 8/5/80 | Bell |
| 4,222,071 | 9/9/80 | Bell, et al. |
| 4,232,337 | 12/4/80 | Winslow, et al. |
| 4,243,848 | 1/6/82 | Utsumi |
| 4,243,850 | 1/6/81 | Edwards |
| 4,253,019 | 2/24/81 | Opheij |
| 4,253,734 | 3/3/81 | Komurasaki |
| 4,268,745 | 5/19/81 | Okano |

Publications

R. A. Bartolini, et al, "Optical Disk Systems Emerge", IEEE Spectrum, August 1978, pp. 20–28.
G. C. Kenney, et al., "An Optical Disk Replaces 25 Mag Tapes", IEEE Spectrum, February 1979, pp. 33–38.
K. Bulthuis, et al., "Ten Billion Bits on a Disk", IEEE, August 1979, pp. 26–33.
R. Michael Madden, "Silicon Position Sensing Detectors for Precision Measurement and Control", SPIE, Vol. 153, Advances in Optical Metrology (1978).
Robert M. White, "Disk-Storage Technology", Scientific American, 243: 138–148 (August, 1980).

The subject matter of these references is to be considered as incorporated herein to the extent relevant.

SUMMARY OF THE PRESENT INVENTION

One purpose of the present invention is to provide improved methods and apparatus over those disclosed in the foregoing references for optically recording and/or reading data from an optical storage medium.

One disk memory storage technique uses a system of lenses and mirrors to focus a laser beam onto a rotating disk D coated with a thin layer of metal as shown in FIG. 1. Data is recorded on the disk by forming microscopic holes along tracks in the metallic layer with a powerful, focused beam; data is read-back by passing a less intense beam over the data tracks and detecting intensity changes in the reflected light. This technique allows data densities many times greater than magnetic disk memories; however, the microscopic nature of the storage medium requires a correspondingly-precise technique for positioning the focused laser beams.

The final beam-positioning element in a lens/mirror system as here contemplated is a galvanometer (or "galvo", G), with an electromagnetically-pivoted mirror $g_m$ that can selectively scan the laser beam radially across the disk (while the entire galvo unit G is to be reciprocated across disk-tracks for "coarse seek" of track location—the tilting of mirror $g_m$ provides "fine-seek").

For "closed-loop" operation of the "beam position control system", it is necessary to communicate to the galvo control circuit (system) a feedback signal indicating the angular position of the galvo mirror. Such a galvo-control system should enhance the accuracy and response time of the beam position; also the effects of cross-coupling from nearby linear motors and other disturbance sources should be minimized. This invention is intended to provide such an improved control system.

One objective hereof is to provide better "control feedback", i.e., to teach the use of a position sensor to determine the angle a galvo mirror is pivoted (relative to the chassis on which it is mounted).

Such a position detector is preferably operated with a monitor beam reflected by the reverse side of the galvo mirror through a simple lens arrangement for detecting the mirror's angular position. This optical approach is advantageous over magnetic or capacitive transducers in that it is immune, in principle, to any electrostatic and magnetic interference from the focus motor; also the optical system can be isolated from the laser beam while also made an analog of the laser's optical system, wherein galvo mirror rotation results in a lateral shift of a focused spot on a flat detector surface.

In a particular preferred embodiment of the present invention, the reliability and accuracy of optical recording and reading (with respect to a rotating optical disk) is significantly enhanced by employment of such a position-sensor unit which functions in conjunction with a three-beam laser arrangement and associated read-signal-processing circuitry whereby to provide improved, more accurate control over recording and reading.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

FIG. 1 is a simplified block diagram showing an optical disk memory arrangement apt for using the invention;

FIGS. 2, 3 show a preferred mirror-monitor embodiment in side and plan simplified view respectively; while FIGS. 5 and 6 are simplified elevations indicating the optical array of this embodiment, these shown in enlarged section in FIG. 7; with relative aperture dimensions indicated in FIG. 8.

Also FIGS. 9A, 9B indicate the magnet-motor subassembly of this embodiment in respective plan and side-sectional views, while FIG. 10 shows the associated coil and magnets in schematic exploded elevation; and FIG. 11 is a photo-reproduction of the associated mounting flexure in plan view; and FIG. 12 is a schematic of an alternative packaging of the optical elements after the manner of FIG. 5.

DETAILED DESCRIPTION OF EMBODIMENTS

Figure 2:
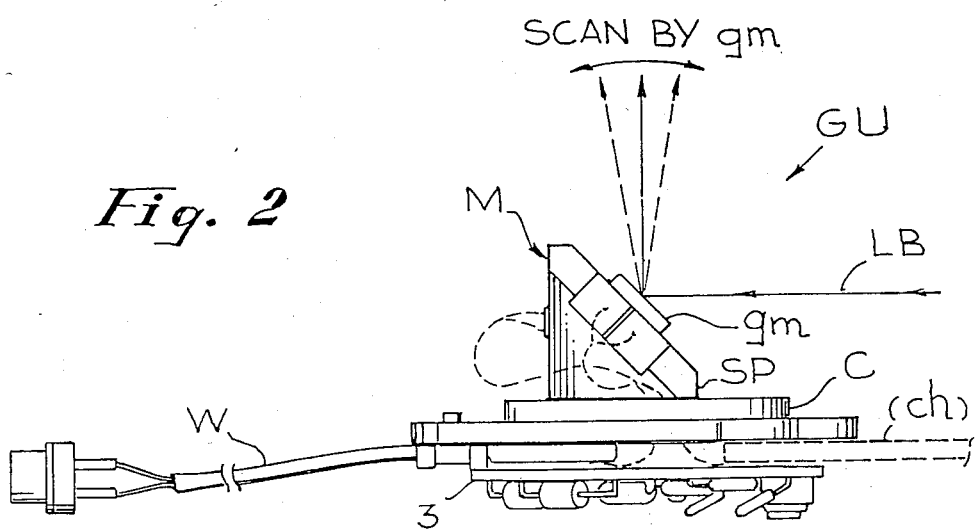
Figure 3:
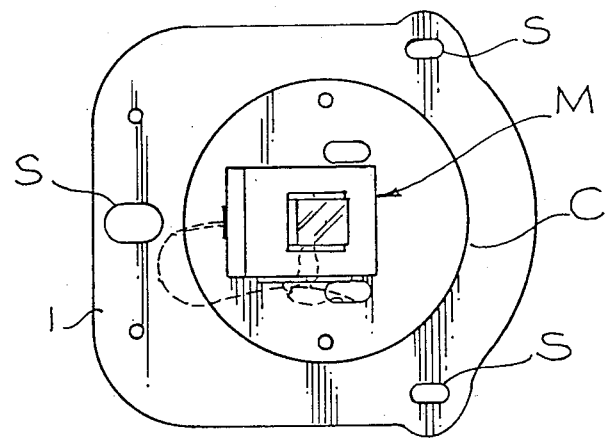

FIGS. 2 and 3 show a preferred embodiment of a (galvo) position sensor unit GU adapted to determine the angular orientation of a galvo mirror $g_m$ as it is pivoted relative to an associated galvo carrier ch (in phantom) and to provide a correlative feedback signal ($s_g$) to related means for controlling mirror position. This arrangement will be understood as especially adapted for operational association with certain Optical Disk Memory (OD) units as known in the art. The galvo mirror $g_m$ will be understood as accommodating beam scanning (laser beam LB) radially across the disk for track selection/centering (e.g., "track-seek", "track-follow" in conjunction with translator means tm FIG. 1) as known in the art. These are typically controlled to compensate for variances in disk position (e.g., "runout correction").

And, except as otherwise specified, all materials, methods and devices and apparatus herein will be understood as implemented by known expedients according to present good practice.

Thus, unit GU will be understood as providing mirror $g_m$ positioned to receive and redirect laser beams (e.g., see beams LB, of 1–2 mm diameter) along a prescribed path to be controllably, selectably diverted by galvo unit GU e.g., via controllably-pivoted laser-mirror $g_m$ (see FIG. 2, where a 10×13 mm mirror $g_m$ is shown mounted on a magnet assembly M, forming part of the galvo unit GU).

Galvanometer unit GU includes a small, high-performance servomechanism which controls the rotational position of front-surface laser mirror $g_m$ (which "steers" all Read and Write laser beams to traverse the related "Final Objective" and "find" the proper track on a subject OMM). This directing of beam LB facilitates operations such as "track-centering" (which may vary with disk-runout) and "track-seek", as workers well know. Preferred exemplary specifications for galvanometer unit GU are given in Table I below.

Another facet of galvo unit GU is an optical "angle-sensor" or mirror-position monitor stage for tracking such rotation of mirror $g_m$. This stage, according to another feature hereof, is contained within the body of the galvanometer unit GU (within casting C, e.g., see FIG. 7 described below) and is implemented optically so that an electrical output from the angle-sensor is proportional to the angular position of galvanometer mirror $g_m$ (e.g., cf output from detector SD, described below). This angular position information can be used for servo control, of positioning and repositioning the galvano unit GU and the linear motor driving the entire associated translator assembly (carriage ch), as workers well know.

TABLE I

| Galvo Unit GU: Sample Specifications | |
|---|---|
| High Continuous Acceleration | |
| Mirror: Angle Range: e.g., within 1–2° | |
| Size | 12 mm × 7 mm × 2 mm |
| Surface Flatness: λ/10 | |
| Reflectivity: order of 97–99% for | λ concerned |
| Maximum Allowable Orthog. Rotation | ≦ ± .1° |
| Natural Frequency: controlled | |
| Objective Focal Length: prescribed | |
| Magnet Type | Rare Earth |
| Coil Resistance | ≈.25Ω |
| Coil Inductance | ≈4.6μ Henr:es |
| Total Mass | ≈50–60 grams |
| Physical Size | 50 mm long × 38 mm dia. |
| Mechanical Rotation Stops: ± 3° | |
| Linearity of Possible Monitor: better than 10% | |
| Bandwidth (Servo): ~ 3 KH$_z$ | |

Typically mirror $g_m$ is designed as a "good" reflector of the laser radiation (e.g., typically at about 6300 A i.e., 633 n.m.).

Straight-forward monitoring techniques: (background)

Now, workers will appreciate that there are various known of inferred, conventional ways to monitor the position of galvo mirror $g_m$.

One is to attach magnetic flux means (moving-coil or moving magnet) at one or several points along the mirror and detect position-shifts thereof with associated fixedly-disposed "Hall Effect" sensors. More particularly, one can mount the laser mirror $g_m$ on a simple flexure-leaf pivot and attach a monitor coil to pivot therewith and monitor coil position. Another method is to mount mirror $g_m$ on a journaled pivot-axle (bearing problem, etc.).

Another way would be to dispose capacitor plates on mirror $g_m$, together with confronting fixed plates coupled to electronic means, to detect mirror movement (inter-plate gap change) as a function of changes in inter-plate capacitance.

Another (distantly related) arrangement might use a "Reticon" optical detector with television camera means whereby a multi-segment monolithic opto-detector chip (i.e., a segmented detector) monitors the position-changes of an image moving across the segments and, using clock means, shift-out an image-produced signal as serial data, much as with a standard "shift register". This is very, very expensive however (see also optical monitoring of mirror position "NASA Tech Briefs", Spring '81, p. 58).

Optical position-monitoring with "opposed mirror":

According to a feature hereof, a rear face of mirror $g_m$ is provided with optical reflector means OR (see FIG. 5 plus enlarged section in FIG. 7, optical-schematic in FIG. 6, aperture layout in FIG. 8) and associated beam/detect means for monitoring the angular position of OR (and thus of mirror $g_m$). A preferred arrangement uses an IR source (LED), and associated IR detector (SD) and intermediate focus means (lens fc—e.g., see FIGS. 5–8).

Such a position detector array OM uses the LED beam as re-directed by reflector OR, rotated conjunctively with galvo mirror $g_m$, through a simple lens arrangement fc to detect the angular position of $g_m$ at SD. This optical approach is advantageous in that it is immune (in principle) to optical, electrostatic and magnetic interference (—these can occur—e.g., in the region of the focus motor). Also, the optical system can function as an analog of the laser R/W system, wherein galvo mirror rotation results in a lateral shift of a focused spot on a flat surface yet be optically isolated from laser beam LB. (A *short* optical path is preferred, e.g., for compactness).

And preferably, reflector OR (and detector SD) can be adjustably pivoted during calibration, to assure proper alignment of the monitor beam—e.g., resetting angular offset of the position detector. With the laser beam aimed as described above (galvo coil-current being "zero"), reflector beam, or LED, or SD can be repositioned to yield ZERO detector output ($S_g$).

When array OM is properly aligned, light emanating from source LED (infra-red emitting diode or IRED), will be directed at reflector OR and sent through planoconvex lens fc to form an image of the IRED on the (active surface SD-a of) detector SD. Any pivoting of galvo mirror $g_m$ will change the wavefront relationships of the OR beam and shift the image laterally, in the direction of beam deflection (see FIG. 5).

The result of galvo mirror deflection (angle $\theta$) is that the image is shifted laterally (distance d) in the direction of beam deflection. Thus, one may describe this as $d = f(2\theta)$, where f is the focal length of the lens. Detector 31 is thus intended to detect shift of mirror angle as converted to linear position-displacement.

One preferred detector element 31 is a "segmented" ("bi-cell") position detector as further described below (also see description in publication by R. M. Madden, cited above; discussed further below).

FIG. 5 illustrates how, in such a galvo unit GU, an optical monitor arrangement OM can operate to indicate rotation of such a back-reflector OR, according to another feature. Here, the galvo mirror $g_m$ is modified so that a "back side" (opposite laser mirror $g_m$) is provided with reflector means (surface OR) adapted to optimally reflect the monitor radiation beam M-b from a source LED (e.g., IR-LED at 900 nm, with built-in lens-collimator as known in the art). This illumination (beam M-b) is to be focused by focus means fc and detected at associated detector SD (e.g., a split-cell or bi-cell, detector as known in the art; alternatively a longer segmented cell may be used for larger beam-excursions).

No separate light shielding enclosure is needed with such an arrangement since the mirror-mount (casting C) incorporates them (see FIG. 7). Preferably the monitor-optics OM are adapted to enhance detect-signal amplitude as known in the art (e.g., larger lens; lens-enlargement of beam image; to decrease noise; e.g., by tight shielding from laser illumination and other stray light, also enhancing S/N).

FIG. 3 is a plan view, somewhat simplified, of galvo unit GU, showing the basic mounting-plate 1 carrying the galvo components. Plate 1 will be understood to be mounted in adjustably-positioned fashion on a translator carriage means ch (shown in phantom FIG. 2, see mounting slots S). A novel galvo-casting C (see FIG. 7) is mounted upon plate 1 and according to a feature hereof is adapted not only to mount the laser mirror $g_m$ but also to serve as a unitary mount for associated magnetic circuit means M (used to rotate laser mirror $g_m$, details in FIG. 10) and for the associated "mirror-position-monitoring" means OM (comprising beam source LED, and associated reflector, detector and lens, etc. as explained below). Moreover, according to another novel feature, detailed below, mirror $g_m$ and the associated (opposed) monitoring reflector OR are both mounted on a single unitary torsion spring sp (plan view FIG. 11) along with parts of the associated pivot motor PM.

Figure 4:
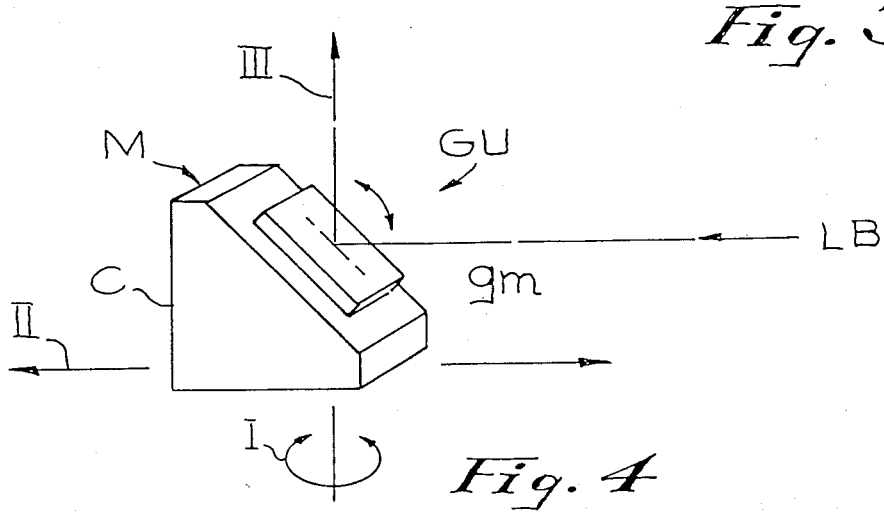
FIG. 4 showing a like embodiment as adapted for adjustment.

Other features will be recognized as conventional such as the connecting wire harness "w", the electronic and related components, ec, mounted below plate 1 on PC board 3, etc. FIG. 4 shows galvo unit GU in partial schematized cut-away view, as adapted for galvo-rotation, for mirror-rotation and for galvo-translation.

Galvo package:

Workers will appreciate the advantages of the indicated galvo packaging arrangement; how simple and convenient it is, how light and compact. For instance (as described below in more detail) note that this arrangement readily accommodates using the reverse side of galvo mirror $g_m$ as a reflector for monitoring mirror position—especially via a radiation beam-detector combination like LED and SD in FIG. 6, where these can be packaged within a single casting, mounting the two mirrors and their pivot motor. Such a casting provides a light, compact unit that is inherently shielded from all ambient light and affords a safe, rigid, secure mounting—different from what has heretofore been conventional in the art.

Other associated advantages will be apparent to workers. For instance, heretofore when workers have attempted to monitor mirror position optically they have been forced to provide a light shield for the optical monitor system—this unnecessarily adding parts, mass, etc. Alternate packaging modes will occur to workers and a different kind of mirror-position-monitoring system can be accommodated in such a packaging arrangement.

FIG. 7 shows how the aforementioned packaging feature can readily accommodate using such a dual-mirror array, mounting it on a flat flexure spring sp and juxtaposing an associated pivot motor (part M, etc.) with an optical monitoring system in a compact, secure, rigid packaging array, shielded from ambient optical interference, etc. That is, here, a single unitary casting C (a portion of which is shown here and also in FIGS. 2 and 3) is adapted to mount various elements of magnetic circuit M while also mounting and positioning source LED, detector SD and associated lens fc in reflective-communicating fashion relative to reflector OR (here, LED and mirror $g_m$ and reflector OR are shown in phantom as mounted on, and in, magnetic circuit M, also being shown better in FIGS. 9A and 9B, described below). Elements of magnetic circuit M will become more apparent on consideration of the details thereof described below relative to FIGS. 10 and 11.

Also, the electronics package ec (e.g., pre-amps) is preferably disposed to be magnetic-shielded, reducing interference by flux from coils of galvo mirror $g_m$ (cf flux can be strongest along coil-winding direction).

FIG. 12 is similar except that a related source LED' and detector SD' are disposed in relatively the same direction and a related lens fc' is used twice. Here, as in the arrangement of FIG. 5, use of a compact lens package and larger lenses can reduce any optical distortion that may occur (e.g., in the linearity of the system because the image of the IRED "vignettes" as the monitor-beam swings off-center).

Monitor Array OM:

FIGS. 6–8 will be recognized as detailing some facets of this optical monitoring system OM. Thus, FIG. 6 shows the optical monitoring array OM as including a solid-state beam source LED (e.g., Telefunken LED; model #CQY35NF is preferred; it operates at about 900 nm and delivers ample power for this type of arrangement; it emits a wavelength suitable for the preferred kind of available detector at maximum sensitivity). Array OM also includes an associated detector SD and focus lens fc. Detector SD should respond maximally to this wavelength; thus, here we prefer "bi-cell unit" by United Detector Inc.: model #UDT PIN-POT 2D. The lens fc can, of course, amplify beam movement on reflector surface OR and also concentrate the beam upon a relatively small active area SD-a of detector SD. Of course, in certain instances such a lens means might be eliminated, as workers know; (however, this would necessitate a longer detect-surface and other undesirable modifications).

Thus, as the mirror $g_m$ is rotated, its companion reflector OR will conjunctively rotate and cause the light beam from LED to accordingly move across active detector surface SD-a so detector SD will give a position output p-o as known in the art. Output p-o may be processed and used to verify R/W track location, and correct this location (e.g., center the laser R/W beam on a given track) with known feedback control, etc., as known in the art.

FIG. 8 shows the layout of this sensor with a rough indication of the relative size and spacing of the apertures of the elements of array OM. The dimensions are only suggestive, of course. The relative spacing of these parts here is the order of a few millimeters. As are the aperture diameters.

Flexure design:

Several methods of suspending the rotating mirror assembly were considered: such as a flexure-blade pivot made of rubber and an axle-mounted array. But, with the extreme requirements postulated here (e.g., life of 10+ years—many hi-impact "crashes"), life performance of rubber was gravely doubted. Also, we have found that rubber flexure pivots would allow hysteresis and excessive off-axis (orthogonal) rotation of mirror $g_m$.

A "torsion bar" mount was favored as the simplest, least expensive method that could be used to meet (most if not all) performance requirements (see Table I). And the design of a simple rectangular cross-section torsion bar-spring was adopted (see FIGS. 9, 11; also see "Formulas for Stress and Strain", 5th Edition by Roark and Young. And, see "Machine Design", Jan. 8, 1981, pp. 114, 115 re "silicon torsion bar", its manufacture and use).

To optimize spring suspension performance, certain beryllium-copper was selected as the preferred flexure material. With proper heat treatment, the tensile yield strength of BeCu can be increased to approximately 180,000 psi; also BeCu was found to exhibit excellent fatigue characteristics and relatively low hysteresis.

And, as another advantage, it will be seen the preferred torsion-bar mounting spring sp (e.g., see FIG. 11) also provides galvo mirror $g_m$ with a natural mechanical "neutral" position—to be assumed when no current flows in the pivot-motor (coil C-M thereof). During alignment, mirror $g_m$ will be "set" so the laser beam is centered in its objective when the pivot coil C-M is unenergized. A related advantage is that angular position information will be developed at detector SD to be available for positive feedback control and associated reduction in spring constant.

Now, such a spring mount sp is superior to conventional practical approaches to this problem. It can coact with novel moving-coil motor to enhance flux coupling, and improved magnetic efficiency (e.g., less stray flux) than known moving magnet/moving coil designs; and it can accommodate an opposed monitor-reflector like OR; it can readily accommodate alignment of the center-of-mass with the pivot axis; it can be made lightweight, responsive and easy to accelerate; it is rugged and stable (e.g., able to survive hi-impact crashes against stops); it presents no significant "field fix" problems, and it is well adapted for Optical Mass Memory (OMM) disk applications (e.g., as detailed below).

Magnetic Circuit Optimization; (moving-coil motor):

The basic magnetic circuit, with magnets, is shown in FIG. 10. The basic overall size of the circuit is fixed once the large front-mirror $g_m$ is specified. One may optimize the dimensions of the magnetic gap vs. coil volume, so that maximum drive-force is achieved consistent with no unreasonable waste of flux.

Circuit flux levels:

To take advantage of the strength of the rare earth magnets m-2, m-2' used in this galvo, it is important to keep flux levels within the (soft iron) magnetic circuit (m-1, m-3, m-4, etc.) at or below the saturation level of the circuit material. "Soft iron" with a saturation level of about 20,000 gauss is preferred as the circuit material. Maximum and minimum flux levels are affected by extremes in the cross-sectional areas (e.g., caused by tolerances in machining). The small center piece or core m-4 will typically exhibit over 20,000 gauss; it can be made larger to reduce this flux level, but this will reduce power to the angle-sensor (because increased volume of the iron would decrease the space for reflector OR located within the hollow center of core m-4, thus reducing beam size M-b and detector output).

Coil inductance:

To minimize resistance and coil inductance, a single layer coil may be used; this is preferred. Workers can see it is also possible to increase coil parameters to match common existing power amplifiers (e.g., 4–8 ohm hybrid audio-amplifiers).

As workers know, one of the problems in packaging (e.g., see FIG. 7) is how large to make reflector OR (to increase output signal amplitude from detector SD), consistent with the minimal volume-dimension allocated and yet leave enough of magnetic circuit M to rotate the mirrors effectively.

According to a related feature, better illustrated in FIGS. 9 and 9A, mirrors $g_m$ and OR are mounted in opposition (on opposing sides) of core (torsion-blade) 23 of flat flexure spring sp (plan view of sp in FIG. 11). Reflector OR is preferably mounted in the hollow center of magnet-core piece m-4 (of magnet assembly M), core m-4 being disposed facing blade 23 of spring sp and moving coil C-M thereon—thus application of current through the motor coil C-M will cause the blade 23, carrying the 2 mirrors and coil C-M, to pivot as known in the art.

Respective opposite-poled sides of core m-4 functions to couple the two working gaps about coil C-M. Each are confronted across a respective flux gap, by a respective pole shim m-3, m-3' of opposite polarity. The magnetic circuit is completed through the low-reluctance, rare earth magnets, or flux sources, m-2, m-2' and through flux return circuit (ring) m-1.

As workers will see, shims m-3, m-3' may be eliminated (this is preferred if feasible; the shims merely serve to accommodate off-size magnets without need to specially shape them); with magnets m-2, m-2' extended to occupy their position here. Also, core m-4 will be eliminated if flux is adequate without it.

The two sides of the outer circuit (ring m-1) may be chamfered as indicated in FIG. 10A and in FIG. 7 to conserve space.

Rare earth magnets m-2, m-2' will be rendered as known in the art, while the other parts of assembly M are preferably of soft iron or other ferromagnetic material. Shims m-3, m-3' (though not, in all cases, necessary) serve to extend the body of a respective magnet m-2, m-2' toward hollow rotatable core m-4 and so concentrate flux there as known in the art.

Coil C-M is attached, for rigidity, etc., to coil-form C-F which is bonded to pivotable center-blade 23 of sp at the base of C-F—C-F having 2 or 4 sides projecting from this base to connect with coil C-M.

When core m-4 is used, it is preferably annealed to increase flux density therethrough and lower its magnetic reluctance—a similar annealing may be given to the other soft iron pieces as necessary and desired (this will also make flux-saturation level more uniform from unit to unit; likewise for other ferromagnetic parts).

The motor characteristics (that is, the number of turns of coil C-M, wire size, current applied, gap width and length, etc.) will be adjusted to provide the required pivoting force, e.g., giving the necessary acceleration and excursion consistent with how flexible torsion-blade 23 is. Leads LL-c are shown in FIG. 9A, lead to an appropriate current source for controllably activating coil C-M conjunctive with the influence of magnets m-2, m-2' to provide the pivoting action desired, as workers know.

Workers in the art will appreciate the uniqueness and advantages of such a torsion-spring mounting and how well adapted it is for accommodating the difficult high ambient acceleration (single axis rotation); for instance, no other system is known which affords such high unidirectional flexibility, while at the same time providing very high stiffness in all other directions, especially orthogonally. This is especially so given the subject requirements for minimum size and cost.

By comparison, an analogous axle/ball-bearing mounting would fail miserably in "unidirectionality" (orthogonal rotation)—while using a simple cantilevered flexure blade would certainly not be as truly unidirectionally-flexible.

Galvo modifications:
Larger core for circuit M:

An increase in the cross-sectional area of the core m-4 may be desired to drop the flux level closer to saturation-level. This will also require a smaller reflector OR (OR fits inside core m-4 and can limit the diameter of monitor beam M-b in the angle-sensor). A trade-off is possible here; balancing core size (cross-sectional area, or flux level and pivot efficiency) vs. reflector size (i.e., limiting beam power reflected to the detector SD). Once a minimum acceptable detector power is determined, this will fix reflector size; then the corresponding flux level in the core piece can be optimized. Of course, a change in reflector size also affects the C-O-G and moment of inertia of the assembly. And, as mentioned, core m-4 will be eliminated if feasible.

Greater coil resistance:

Increasing the resistance of the galvo coil c-1 can facilitate its use with "off-the-shelf" audio power amplifier modules. Although not a controlling factor in galvo design, the use of existing proven modules should reduce cost.

Eliminate pole-shims (m-3, m-3'):

As mentioned, one can eliminate the small soft-iron shims m-3, m-3' (one between each magnet m-2, m-2' and its respective working gap). Shims m-3, m-3' act as a concentrator (funnel) of flux emanating from the magnets into the gap; if they are eliminated and their space filled by magnet material (enlarge m-2, m-2' accordingly), one might thereby reduce flux leakage and conserve working "gap-flux" (reduce path-reluctance). Contrary-wise, it is also possible that the "concentration effects" of shims m-3, m-3' predominates over leakage effects—whereupon gap flux might well decrease if the shims are eliminated (replaced by a larger magnet mass).

FIG. 11 is a photo-reproduction (plan view) of the actual torsion-bar spring part sp preferred for this embodiment. For convenience, spring sp is formed from a flat, 2 mil Be-Cu shim stock of the indicated size, being etched or otherwise cut-out, to exhibit a hollow fixed outer (rim) portion 21 and an inner relatively twistable center (core or blade) portion 23. Blade 23 is connected to rim 21 via a thin pair of opposed like upper and lower lands (arms) 25, 25' (arms 25, 25' thus form the actual torsion-bar springs). As detailed elsewhere, when the pivot-motor coil C—M is attached to blade 23, it will coact with the permanent magnet flux across the air gaps to cause blade 23—and mirrors $g_m$ and OR fastened thereon—to proportionally rotate relative to fixed rim 21 and the rest of the galvo structure (GU).

This galvo suspension spring sp will be recognized as well-suited for the indicated service, with the relatively rotatable blade 23 accommodating high flexibility in one twisting-axis, yet being very, very stiff in all other directions—this "uni-directional flexibility" nicely accommodating single-axis rotation of the mirrors and associated magnet parts mounted thereon.

According to a preferred construction, the material of spring sp comprises a single piece of "high tensile" strength/high yield strength stock such as 2 mil shim stock of Be-Cu #172 (for maximum tensile and yield strengths, on the order of 150–200,00 psi—choose thicker stock for increased stiffness, of course). This part may be etched-out to supply the given dimensions and configuration; preferably first being "heat treated" before etching (i.e., hardened, then aged to render a hardness of RC#40+—e.g., the aging may comprise heating for about two hours at 600° F. after hardening-—and before etching).

Other materials and related treatments will, of course, occur to those skilled in the art, for instance, other similar Be-Cu alloys such as #Be-Cu 170 (though this is weaker), phosphor-bronze, various stainless steel alloys or the like.

Angle Sensor:

Basic optical layout: The basic layout of the optical system used in the angle-sensor is shown in FIGS. 6–8. As the small mirror OR is rotated, the spot projected on detector SD is displaced. The distances between all the elements are basically determined by size and space limitations. For instance, one can achieve a spot displacement on detector SD of ±.025 inches for a mirror rotation of ±1.5 degrees (±3.0 degrees of beam rotation), using a lens with a focal length of 0.5 inch (12.

fmm). Detector SD can be located at the focal length of the lens because the light from source LED is "close to parallel" ("nearly collimated").

Thickness of Rear Mirror (OR): As mentioned, the angle-sensor array C-M includes a small reflector OR which is attached to rear of flexure sp. It is highly important to properly balance the moving assembly. In order that the center-of-mass of this rotating assembly be kept close to (within 8 mils of) the actual axis of rotation, a thickness of reflector OR is selected which locates the center of gravity on the rotating axis of spring sp. A thickness of 2.54 mm was satisfactory for this embodiment.

Position Sensor Selector:

The preferred arrangement features position sensors which are "segmented" (e.g., SD is preferably a bi-cell, as opposed to "lateral cells"; and in some form of silicon photodiode) as well known in the art. "Bi-cells" exhibit superior position-sensitivity and resolution; however their dynamic operating ranges are limited by the surface dimensions of the cell (and of size of the optical image focused onto the detector). Segmented cells require uniform illumination intensity in the spot to achieve good linearity; and they can operate at bandwidths well in excess of 10 KHz, as may be required in pulsed and high-speed tracking applications.

A "bi-cell" is a monolithic structure with two distinct separated active areas (anodes); and a "cathode" common to both regions. The bi-cell is arranged to indicate the position of a light spot with respect to the boundary between active areas.

The simplest use of a bi-cell detector involves imaging a uniform spot of light onto the detector in such a way that the center of the detector is included within the light spot. Photo-generated currents are thereby induced in both of the active regions and flow into the external circuit. The magnitude of the current flowing from each region is proportional to the integrated light flux falling on that region. Presuming a uniform light intensity, the difference between output signals from opposite regions ($S_1$, $S_2$) divided by the sum of currents from opposite regions ($C_1$, $C_2$) yields a normalized transfer function $F_t$ specifying the position of the spot centroid as a fraction of the bi-cells overall operating span.

$$\left( \text{i.e., } \frac{S_1 - S_2}{C_1 + C_2} \approx F_t \right).$$

The operating span for the preferred mode of operation is proportional to the radius of the light spot. When the light spot is more than a radius away from center, both regions are no longer illuminated and the transfer function no longer represents the analog spot position.

The linearity of a segmented detector would actually be quite good if a light spot of perfectly uniform intensity were used. Most practically realizable light spots, however, have more of a gaussian intensity distribution and may exhibit any number of other abberations. Consequently, segmented detectors often deviate greatly from the ideal linear transfer characteristic. Segmented detectors are used most successfully in nulling applications where a very sensitive measure of small deviations about zero are required.

Now, the source LED is selected on the basis of its beam profile as well as its output power. Here, a preferred LED, with relatively high-intensity output and with a very narrow beam profile, is model CQY-35-N-F made by AEG-Telefunken. having a nominal radiant intensity of 36 mW/SR and a "half-power-angle" of ±5 degrees. One disadvantage of this Telefunken LED is that its emission, around 950 nm, isn't seen by the unaided eye.

The possible temperature variation and its effect upon "null point drift" would render certain detectors impractical (e.g., one will not want a detector giving a continuous position signal output that is dependent on temperature).

Alignment steps:

Three different and separate adjustments are usually undertaken to align the galvo GU on its translator/carriage ch in the Optical Memory apparatus. These three adjustments should be independent of one another and should be undertaken after the galvo is secured on its moving carriage assembly ch. As indicated in FIG. 4, the mounting fixture (see plate 1) which holds the galvo to the carriage ch is designed to allow adjustments I and II. The third adjustment (III) is made by applying a prescribed D.C. offset current to galvo coil C-M.

In addition to these three adjustments, two more adjustments should be made within the galvo unit GU itself. Due to a possible variation between mechanical and optical axes of each LED (e.g., about ±5° has been seen), an LED-SD alignment may be necessary—e.g., as the LED is mounted in the body of the galvo casting C, so that its optical axis (beam M-b) will be aligned with the axis of the angle-sensor optical path (e.g., within 1°-2° thereof).

Then, the detector SD should also be aligned so that its output signal will be zero at "null" for laser mirror $g_m$.

Alternative optical packaging; FIG. 12:

FIG. 12 indicates an optical monitor array OMM' alternative to that of FIG. 5, etc. described above (all elements considered equivalent except as otherwise specified—e.g., source S, lens fc', reflector $M_{ir}$ on reverse side of laser mirror $g_m''$ and detector DL vs. FIG. 5 source LED, lens fc, reflector OR and detector SD). Here, the optical path will be seen as "reflexive", with lens fc arranged for possible dual-use, directing the detect-beam to and from reflector $M_{ir}$. In some instances such a compact array will be preferred.

Conclusion:

It will be understood that the preferred embodiments described herein are only exemplary, and that the invention is capable of many modifications and variations in construction, arrangement and use without departing from the spirit of the concepts taught. As an example, the means and techniques disclosed herein are also applicable to certain other analogous angle sensor or pivot-sensor systems and the like, as well as being applicable for other analogous optical data recording arrangements.

All variations of the invention being merely illustrative, the invention should be considered as including all possible modifications and variations coming within the scope of the invention as defined by the appended claims.

What is claimed is:

1. An improved apparatus for monitoring the pivoting of reflector means, this apparatus comprising:
    magnetic galvanometer motor means adapted to controllably pivot the reflector means;

optical monitor means including source means, detector means and intermediate optical means, the source means being adapted to project a beam directed at a prescribed portion of the reflector means, the associated detector means being arranged and adapted to receive this beam and to responsively generate a "pivot signal" whose variance corresponds to the degree of pivoting; and unitary housing means adapted to mount and package the reflector means, the motor means and the monitor means being depolyed in fixed spatial relation, the monitor means being embedded in said housing means whereby to be isolated from optical interference and to be adapted for selective insertion, removal and re-insertion of said source means, detector means and optical means.

2. The combination as recited in claim 1 wherein the reflector means comprise a mirror surface provided on a laser-reflector unit; and said pivot signals are arranged and adapted to be processed by servo-control means and fed as prescribed "pivot-servo-signals" to control said motor means.

3. The combination as recited in claim 2 wherein the apparatus is arranged as part of an optical disk data storage system, said laser-reflector unit being operated and controlled to scan across and along data tracks on a disk.

4. The combination as recited in claim 3 wherein the monitor means comprises an LED source, an associated solid-state detect cell and intermediate lens means; and wherein the housing means comprises a unitary casting.

5. The combination as recited in claim 4 wherein the monitor means comprises an IR-LED, an associated segmented detect-cell and intermediate lens means; all emplaced and embedded within said casting.

6. The combination as recited in claim 5 wherein the detect cell is a bi-cell disposed and adapted to be swept by the associated IR-LED beam to generate a "pivot-signal" corresponding to pivot-position of said reflector means.

7. The combination as recited in claim 6 wherein the monitor means is arranged to function reflexively so the associated monitor beam requires only a single lens unit.

8. The combination as recited in claim 1 wherein said reflector means is mounted on a prescribed torsion-bar flexure pivot suspension means carried on said housing means.

9. The combination as recited in claim 3 wherein the reflector means is coupled to a mirror for said storage system; wherein the sensor apparatus is adapted to function as an analog of a laser Read/Write system whereby rotation of the galvo-mirror results in a lateral shift of a monitor-spot focused from a prescribed beam source onto said reflector means, while being optically isolated from the laser radiation controlled by said mirror.

10. The combination as recited in claim 9 wherein the monitor means comprises an LED source, an associated solid-state detect cell and intermediate lens means; and wherein the detect cell is adapted to detect a shift in the rotational position of said mirror as converted to linear position-displacement.

11. The combination as recited in claim 10 wherein the monitor means comprises an IR-LED, an associated segmented detect-cell and intermediate lens means; all emplaced and embedded within said casting and wherein the detect cell is a bi-cell disposed and arranged to be swept by the associated IR-LED beam to generate a "pivot-signal" corresponding to pivot-position of said reflector means; and wherein said lens means is arranged to enhance the amplitude of the associated monitor signal.

12. The combination as recited in claim 10 wherein the lens means is adapted to amplify the angular displacement of the monitor-beam as well as to concentrate it upon the detect cell.

13. The combination as recited in claim 9 wherein the apparatus is adapted and arranged to present said "pivot-signal" to utilization means adapted to process it and apply "position-correct" signals to rotate and reposition the mirror.

14. The combination as recited in claim 13 as incorporated in an optical data disk system wherein said "position-correct" signals are processed and employed to verify track location, as well as to reposition the laser beam on a track and/or center the beam.

15. The combination as recited in claim 9 wherein the mirror is mounted on one side of a prescribed pivotable plate with said reflector means mounted in the opposite side of the plate so as to locate the center of gravity relatively close to the pivot-axis.

16. The combination as recited in claim 6 wherein the LED and lens means are arranged to present a monitor-beam which scans said detect-cell with a relatively uniform intensity beam; the detect bi-cell being adapted to indicate beam location with respect to the boundary between its active areas.

17. A method of providing apparatus for monitoring the pivoting of reflector means, this method including:
provision of magnetic pivot galvanometer motor means adapted to controllably pivot the reflector means;
providing optical monitor means including source means, detector means and intermediate optical means, the source means being adapted to project a beam directed at a prescribed portion of the reflector means, the associated detector means being arranged and adapted to receive this beam and to responsively generate a "pivot signal" whose variance corresponds to the degree of pivoting; and unitary housing means adapted to mount and package the reflector means;
while depolying the motor means and the monitor means in fixed spatial relation, and embedding the monitor means in said housing means whereby to be isolated from optical interference and to be adapted for selective insertion, removal and re-insertion of said source means, detector means and optical means.

18. The method as recited in claim 18, wherein the monitor means is selected to comprise an IR-LED source, an associated segmented solid-state detect cell and intermediate lens means, wherein the housing means is formed as a unitary casting; the source, detect cell and lens means being all positioned and embedded within said casting.

19. The combination as recited in claim 17 wherein the reflector means is arranged to comprise a mirror surface provided on a laser-reflector unit; and said pivot signals are arranged and adapted to be processed by servo-control means and are fed as prescribed "pivot-servo-signals" to control said motor means.

* * * * *

UNITED STATES PATENT AND TRADEMARK OFFICE
CERTIFICATE OF CORRECTION

PATENT NO. : 4,564,757
DATED : January 14, 1986
INVENTOR(S) : Edward V. LaBudde, et al.

It is certified that error appears in the above-identified patent and that said Letters Patent is hereby corrected as shown below:

Col. 4, line 28, change "of" to --or--.

Col. 13, line 11, change "depolyed" to --deployed--.

Col. 14, line 46, change "depolying" to --deploying--.

Signed and Sealed this

Twelfth Day of August 1986

[SEAL]

Attest:

DONALD J. QUIGG

Attesting Officer    Commissioner of Patents and Trademarks